May 20, 1930.          L. E. MYERS          1,759,241
EDUCATIONAL DEVICE FOR INTERCHANGEABLE TOPICS
Filed Nov. 23, 1925          3 Sheets-Sheet 1
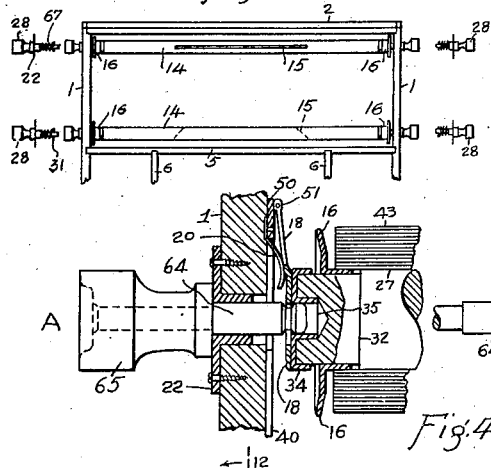

May 20, 1930.   L. E. MYERS   1,759,241
EDUCATIONAL DEVICE FOR INTERCHANGEABLE TOPICS
Filed Nov. 23, 1925   3 Sheets-Sheet 2

Lewis E. Myers  Inventor
N. S. Anstutz
By
Attorney

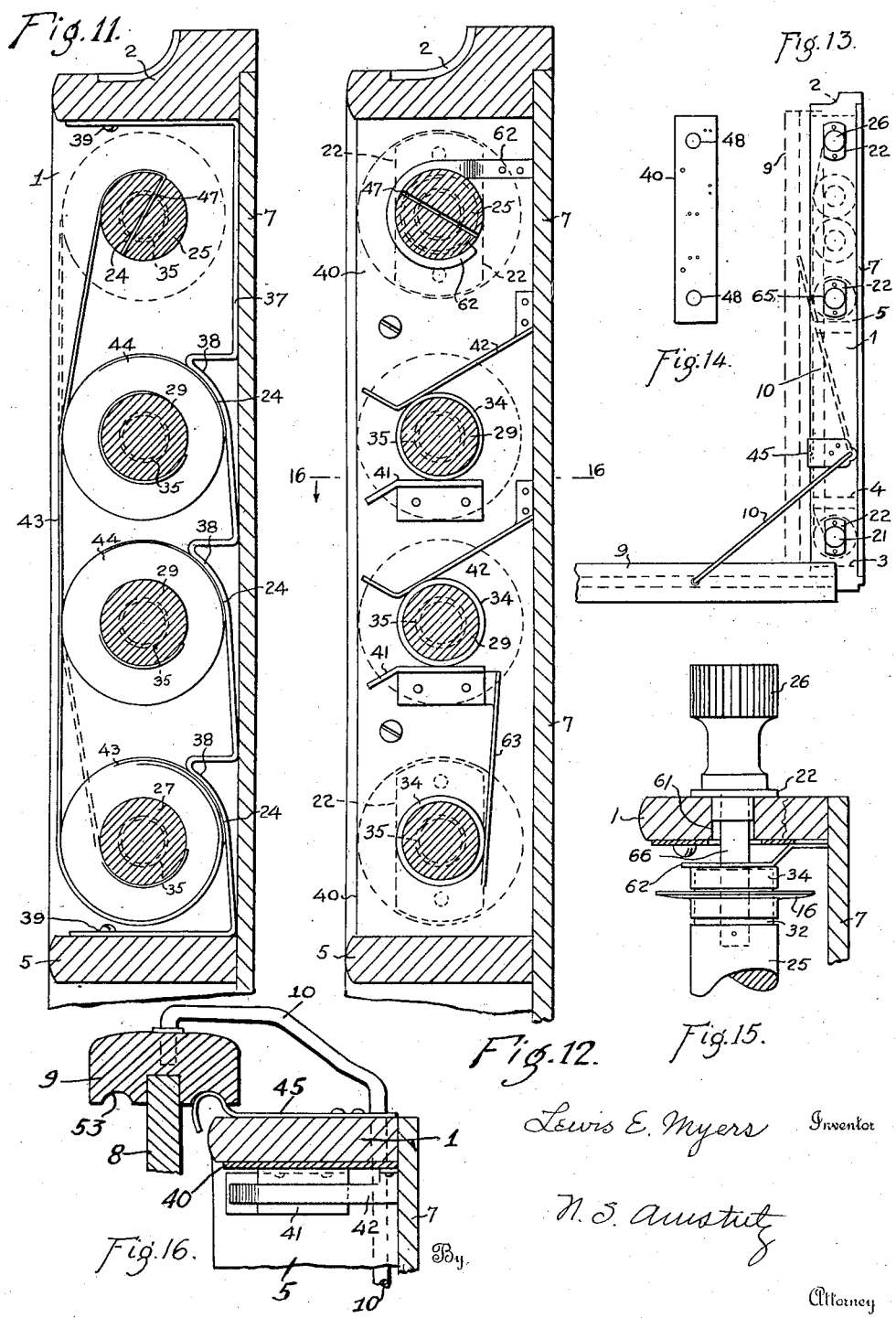

Patented May 20, 1930

1,759,241

UNITED STATES PATENT OFFICE

LEWIS E. MYERS, OF VALPARAISO, INDIANA, ASSIGNOR, BY MESNE ASSIGNMENTS, TO THE NORTHERN TRUST COMPANY AND HAROLD H. ROCKWELL AS TRUSTEES

EDUCATIONAL DEVICE FOR INTERCHANGEABLE TOPICS

Application filed November 23, 1925. Serial No. 71,008.

My invention relates to improvements in educational devices for interchangeable topics, and it more especially consists of the features hereinafter pointed out in the annexed claims.

The purpose of my invention is to provide an educational device that is universal in its application, meeting the needs of different ages of children, youths etc.; that its simplicity of construction relieves it of the usual complication of manipulative devices; that employs a suitable desk frame having scrolls assembled with attachable and detachable rollers, supported by the frame in parallel relation to each other so as to be freely wound and unwound from roller to roller without "sidetracking"; that may use rollers which are in part permanently located in the frame, some of such rollers containing permanently attached scrolls; that may use a plurality of interchangeable removable rollers to which topical educational scrolls may be permanently or detachably secured; that also provides a large number of accessory scrolls featuring various subjects in the sciences, arts, music, mechanics, electricity, chemistry, physics, manufacturing, mathematics and specially adapted subjects to meet the exigencies of rapidly developing home and school needs for a flexible and adaptative system of education; that utilizes the space, hitherto wasted in two-roller scroll display devices, for the storage of extra scrolls; that makes provision through the use of a permanent roller rotatively mounted in the frame for the display on the front of the desk frame of large areas hitherto found difficult; that provides means for applying to old desk frames a permanent roller, a removable roller with a scroll thereon, a pair of extra rollers with scrolls attached, and attachable means positioned on the outside of the frame for rotating the permanent roller and the removable scroll, such old desk frames having been provided with one scroll and two rollers all permanently attached to each other and unremovably held in the frame; that may provide a double ended scroll adapted to be detachably secured to a separate roller at each end; and that also makes provision for the easy "tracking" of the scrolls as they are wound or unwound from roller to roller.

With these and other ends in view, I illustrate in the accompanying drawing such instances of adaptation as will disclose the broad underlying features of my invention without limiting myself to the specific details shown thereon and described herein.

Figure 1 is a diagrammatic representation of a pair of removable rollers held in parallel relation and adapted to receive attachable and detachable scrolls.

Fig. 2 is a fragmentary view of a double-ended scroll pointed on both sides.

Fig. 3 is a front elevation of a desk frame showing a plurality of rollers operatively positioned in the frame.

Fig. 4—A is an enlarged elevation in section of a shiftable knob and the adjacent roller end.

Fig. 4—B is a detached elevation of a shiftable and rotatable knob pin.

Fig. 5 is an enlarged elevation in section of a detaching means for knobless removable rollers.

Figure 6:
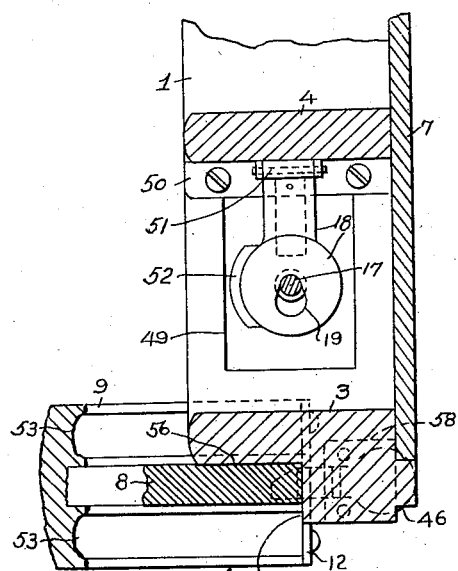

Fig. 6 is an inside elevation of Fig. 5, partly in section.

Figure 7:
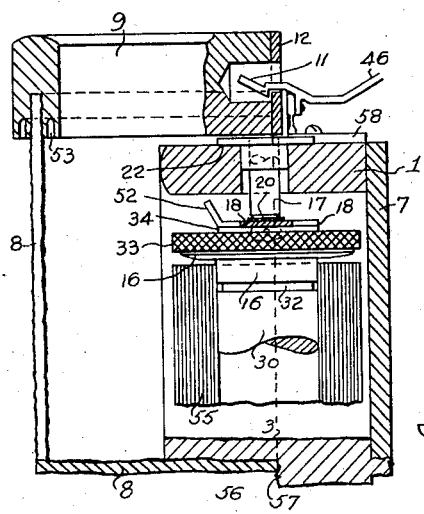

Fig. 7 is a plan view of Fig. 6, also partly in section.

Figure 8:
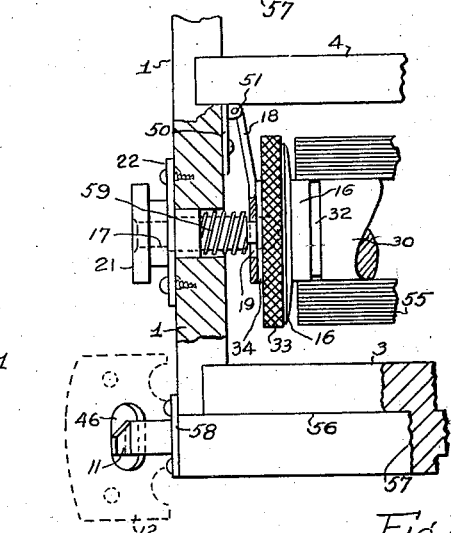

Fig. 8 is an elevation of a knurled driving head for scroll rollers similar to Fig. 5, also showing a spring catch for holding the desk frame and board together.

Figure 9:
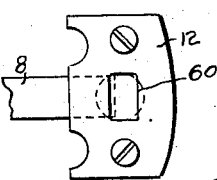

Fig. 9 is a detached elevation of one end of a side arm with a locking plate secured thereon.

Figure 10:
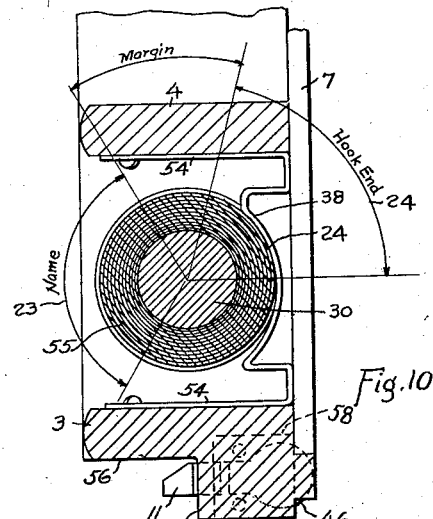

Fig. 10 is an elevation in transverse section of a large area display scroll and the device for holding it from unwinding.

Fig. 11 is an elevation in section on line 11—11 of Fig. 3.

Fig. 12 is an elevation in section on line 12—12 Fig. 3.

Fig. 13 is a reduced scale side elevation of a desk frame and attached board in open relation.

Fig. 14 is a detached elevation of a side supporting plate.

Fig. 15 is a plan view in section of a tension device applied to a permanently positioned roller.

Fig. 16 is a plan view in section on line 16—16 of Fig. 12 also showing the relation of a side arm and the spring catch, on a lower plane.

In practically carrying out my invention I may use various equivalent details of operation and structure without departing from the spirit of my invention. In Fig. 1, there is shown a diagrammatic representation of the broadest scope of my educational device in which side members 1, top member 2 and a middle member 5 constitute a frame in which removable rollers 14 are placed. These are held by spring knobs 28 separately shown alongside. I am aware that pairs of rollers with attached scrolls have been in use since the vogue of the Hebrew torah and I am also aware that scrolls held in permanent parallel relation in suitable frames have been used, but I am not aware that permanent or removable rollers held in parallel relation in a frame for use with attachable and detachable scrolls have been used prior to my present invention.

In the upper portion of Fig. 3 there is shown a modified adaptation of my invention applied to existing forms of desk frames. Such frames also comprise sides 1, a top member 2 and a middle member 5, similar to those shown on Fig. 1. In addition, the sides 1 project downward where they are attached to a bottom member 3 and a lower member 4. The space between the middle member 5 and the lower member 4 may, if desired, be divided into several compartments by vertical divisions 6. The back of the frame is closed by means of a panel of plywood 7, on the outside of which there is usually mounted a map or any other desired subject.

The desk frame as above described is provided with a laminated reversible detachable board 8 that has side arms 9. The front or rear edge of the board between the ends of the side arms is seated underneath the bottom member 3. The side arms 9 have grooves 53 formed on their inside face, above and below the board 8. The grooves 53 formed adjacent both faces of the board 8 on the inside and throughout the length of the side arms 9 cooperate in a well known manner with spring catches 45 which snub into the grooves as the board is pressed against the frame 1 so as to hold the board against the desk frame when it is closed, as shown by dotted lines in Fig. 13. The board itself is held against rising by the underface 56 and the frame is stopped from sliding across the board by the stop 57, also formed throughout the entire length of the bottom member 3, similar to 56. A pivoted bail 10 has its free ends detachably positioned in the side arms 9. This will hold the frame at about right angles to the board when the desk is opened. When the board is in an open position the bail 10 is not sufficient to hold the lower edge of the frame in secure engagement with the board in all directions; hence heretofore in the practical use of desks of this kind a sliding bolt (not shown) has been placed in the bottom member 3, adjacent the side member 1 of the frame so as to enter the side arm 9 at about the position indicated by 13 in Fig. 3. As the space between the bottom 3 and the lower member 4 is just about enough to accommodate an extra roller 30 with its scroll 55, there is not room enough to also permit of the usual sliding bolt with its upstanding knob, above referred to, for holding the frame and board in locked relation.

Without using the above sliding bolt expedient I am able to securely hold the board and frame in engagement in all directions with each other, without encroaching on the limited space between the members 3 and 4, by means of a spring catch 11, shown in Figs. 7, 8 and 10, which enter an opening 60 in a plate 12 secured to the end of a side arm 9. This catch will automatically lock the frame and board to each other whenever the edge of the board is brought into engagement with the bottom member 3 at 56 and 57. A pressure on the thumb portion 46 will instantly disengage the catch from the plate and permit the board to be folded against the frame. The catch 11 and thumb piece 46 are supported on the side member 1 by a base 58. The board 8 is reversible on the bail 10 in order to bring both of its faces to the top as desired. Locking plates 12 may be secured to both ends of each side arm 9, and catches 11 may be positioned at the bottom of each of the vertical members 1, if desired.

My improvements can be applied to old desk frames, as shown in the upper portion of Fig. 1. Old desks have permanent rollers with a scroll pasted at each of its ends to one roller, which rollers are turned by knobs 26 that have stems 66 which project through holes 61 of the frame. The knobs are secured to the rollers 25 so that these rollers can be turned forward or backward as desired from the outside of the frame. I adapt these old structures to my improvements thru the removal of the old rollers, scroll and knobs, and the substitution of thin metal side plates 40—one on the inner face of each of the side frame members 1. These side plates, shown in Fig. 14, have openings 48. Through the upper openings 48 the stems 66 of the permanently engaging driving knobs 26 may project and engage the permanent roller 25. The disengageable knobs 65 used to rotate the removable roller 27 project through the lower openings 48 of the plates 40. The side plates may have supporting shelves 41, attached thereto, to support the extra rollers 29. Retaining springs 42, shown in Fig. 12, or any other means secured to the plates 40 in any desired manner, serve to hold the extra rollers in place when not in use. These rollers occupy the vacant space between the permanent roller 25 and the removable roller 27—a space that in desk and scroll use has heretofore been wasted. By utilizing this space, I substantially gain the equivalent of three separate desks with but one desk actually in use. The ends of the rollers 29 rest on the ledges 41, and as stated, they are held in place by the springs 42 ready for use at any time that either one of them with its attached scroll 44 is to be exchanged for the removable roller 27 and its scroll 43. When this exchange is made the roller 43 is stored in the same place which the roller 44 previously occupied.

In Fig. 3 the permanent roller 25 has a slot 47, similar to the slots 15 in rollers 14, formed therein whose ends are cut at an angle so as to assist in centering the bevel-edged tongue or "hook" portion of a scroll shown in Fig. 2. This provision insures that a scroll end 23 will be properly positioned between the ends of the roller 25 or on any other rollers. This precautionary feature in connection with the two sets of bevels 24 formed on a scroll end in connection with the slot 47 and loose heads 16 prevents "sidetracking" as a scroll is wound onto the roller. The front or entering end 23 of a scroll has a straight or "hook" portion 70 with beveled ends 24 which enter the slot 47. Back of the straight front 70 and approximately parallel with it, two straight portions 71 are formed. These engage the roller 25 beyond the ends of the slot 47, and they assist in leading the scroll straight onto the roller. The straight portions 71 which end in bevels 72 formed at each edge of the scroll assist in positioning the loose heads 16 in relation to the edges of the scroll, and also prevent the scroll riding onto the heads. In this way damages, through torn scroll edges should the heads be immovably fixed on the rollers, is avoided. The heads 16 are prevented from falling off the rollers 14, 25, 27, 29 or 30 etc., by means of caps 34 or otherwise.

In order that the scrolls 44, or substitute scrolls, will not unwind while they are held in storage on the supports 41, a central tension plate 37, shown in Figs. 3 and 11, has its ends 39 bent at about right angles, by means of which it is secured to the members 2 and 5. It has three curved portions 38 which press against the upper-rear side of the scroll 43 and the scrolls 44 to hold the ends 23 against unwinding. These curved portions 38 do not engage the scrolls on their under side, which expedient concentrates the tension where most needed at the upper-rear side of the scrolls.

In order that a much greater area can be made visible than is ordinarily found in the space available on two roller scroll equipments, I place an extra scroll 55 and its removable roller 30 between the members 3 and 4. This roller, as well as any of the others, if desired, may be made to be rotated by knurled heads 33, as shown in Figs. 5, 7 and 8, which heads are fixedly secured to the ends of the rollers. They are positioned just inside of the vertical members 1 of the frame, and being knurled the roller may be rotated by the hand as needed. On account of the proximity of the sides of the bail 10 to the end position of the roller 30, it is found more expedient to use the knurled heads 33 rather than the projecting knobs 26, 28 or 65 at this point for rotating the roller 30. The disengageable knobs 28 or 65 may, however, if occasion should arise for their use, be operated in connection with the roller 30.

Any desired well known form of frictional tension may be used against the rollers 14, 25, 27, 29 and 30 when they are in an operating position to hold them against too free movement. One form of a combined tension and disengageable driving means is shown in Fig. 4—A. This substantially consists of a flat member 18 having a slotted opening 19 that engages a groove 68 in the shiftable bearing pins 17 and 64. The plates 18 may be hinged at 51 on the bracket 50 located inside of the vertical members 1, and springs 20 serve to press these plates inwardly and hold the driving pins 17 in engagement with openings formed in the ends of the rollers, and at the same time hold the plates 18 against the ends of the rollers to form frictional brakes. A bearing plate 22 projecting into the openings 61 formed in the members 1 for the usual turning knobs 26 serves to hold the pins 17 and 64 in alignment. These pins, wherever used in connection with scroll rollers, may have manipulating heads 21 or knobs 65 secured to their outer end, which parts abut the bearing plates 22 and form a stop for such pins which limits the distance they may enter the ends of the rollers.

If it is desired that the pins 17 or 64, shall also serve as means by which the rollers may be rotated, cross pins 31 may be placed in their front ends as shown in Fig. 4—B. These cross pins engage slots 36 in the bushing portion 35 of the roller end cap 34, to which knurled heads 33 may be formed therewith or be attached thereto. When any scroll rollers are to be operated by means of knurled heads 33, without the use of projecting knobs 28 or 65 the pull-out heads 21 are substituted. The ends of the scroll rollers are turned down at 32 to form a seat on which the loose heads 16 may slide axially and also rotate, independently of the roller.

It is quite obvious that the knobs 26, permanently secured to the roller 25, may be fastened to the roller in any desired manner. The double ended scroll, shown in Fig. 2, may be printed on both sides so as to have double value of its entire length.

In case it is found necessary to provide additional clearance room for the plates 18, the side members 1 may be recessed at 49, as shown in Figs. 5 and 6. These plates 18 may be beveled on their front edge, at 52, so as to be pushed to one side as a scroll is being inserted. The scroll 55, while stored fully wound, between members 3 and 4, is held against unwinding by a tension plate 54 which has a curved portion, similar to the curved portions 38 of the tension plate 37, formed thereon.

Various modified forms of spring brakes may be used; for instance, a coil spring 59, shown in Fig. 8, is the equivalent of the flat spring 20, shown in Figs. 4 and 5; and the spring 62, shown in Figs. 12 and 15, is also an alternative expedient. The springs 62 operate against the caps 34 placed on the ends of the rollers. If desired, they may be placed adjacent both ends of a roller. Another modification is shown in Fig. 12 where the flat spring 63, held beneath the lower ledge 41, rides against the outside diameter of the cap 34 of the roller 27. These different expedients are largely substitutes of each other and they may be used individually as the exigencies of various practical needs may demand. Similarly the springs 67 on knobs 28, Fig. 1, are, in function, practical substitutes for the springs 20 and 59, all of which serve to hold the manipulative roller spindles in engagement with the roller ends.

It is quite obvious that my invention, on acount of its great simplicity and universal adaptability, fills a need that has not been met heretofore; and to more fully meet this need, I provide a large number of extra scrolls 44 dealing with consecutively related or isolated subject matter, such extra scrolls beyond the capacity of the desk may be stored in individual boxes or group containers, appropriately labeled. The front end of each scroll adjacent the hook end 24 will also bear the name "Music", 69, or otherwise of the scroll as shown in Fig. 2.

If desired, storage cabinets may be provided with supporting plates similar to the central portion of plates 40, combined with tension springs 42, to store the extra scrolls in any desired group relation.

What I claim is:

1. In educational devices, a suitable frame, attachable and detachable rollers positioned in the frame, means for rotating such rollers, attachable and detachable scrolls adapted to be held relatively flat between a pair of rollers for display purposes, a pivoted reversible board for covering the front of the frame, a permanent covering for the rear of the frame, a bail connecting the board to the frame, a spring catch on the frame, and cooperating means on the board for locking the frame and board to each other in an automatic manner against disengagement in all directions.

2. In educational devices, a roller having a slot formed lengthwise thereof and terminating in beveled ends, loose flanged heads on the roller near its ends, a suitable frame in which the roller is rotatable, an attachable scroll on a second roller positioned in parallel relation to the first roller and also rotatable in the frame, a tongue on an end of the scroll having a relatively straight front terminating in beveled edges adapted to enter the roller slot, a second straight portion approximately parallel with the first adapted to engage the roller between the slot and the end of the roller, and a pair of bevels connecting the edges of the scroll to the second straight portion whereby the scroll is guided between the loose heads.

3. In educational devices, a suitable frame, an extra topical scroll wound on itself upon a roller to be stored in the frame said scroll having its free end formed with a tongue having notched edges and having an identifying indication placed on the scroll adjacent the free end, and means attached to the frame for holding the free end of the scroll against itself without obscuring the indication.

4. In educational devices, a skeleton frame, comprising top, bottom and side members, an upper slotted permanent roller positioned between the side members, and beneath the top member, projections from both ends of the roller extending through the sides of the frame and terminating in enlargements, a second or removable roller spaced apart from the upper roller and positioned in parallel relation thereto above the bottom member, detachable driving means for each end of said roller secured on the outside of the side members of the frame, frictional retaining plates on the inside of the side members for supporting extra rollers, and permanently secured scrolls on the removable and storage rollers.

In testimony whereof I affix my signature.

LEWIS E. MYERS.